United States Patent
Luo et al.

(10) Patent No.: US 9,854,570 B2
(45) Date of Patent: Dec. 26, 2017

(54) SIGNALING OF VIRTUAL CELL ID

(71) Applicant: QUALCOMM Incorporated, San Diego, CA (US)

(72) Inventors: Tao Luo, San Diego, CA (US); Wanshi Chen, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 642 days.

(21) Appl. No.: 13/910,416

(22) Filed: Jun. 5, 2013

(65) Prior Publication Data

US 2013/0329657 A1 Dec. 12, 2013

Related U.S. Application Data

(60) Provisional application No. 61/656,895, filed on Jun. 7, 2012.

(51) Int. Cl.
*H04W 4/00* (2009.01)
*H04W 72/04* (2009.01)
*H04L 1/00* (2006.01)
*H04L 5/00* (2006.01)

(52) U.S. Cl.
CPC ......... *H04W 72/042* (2013.01); *H04L 1/0038* (2013.01); *H04L 5/0048* (2013.01); *H04L 5/0053* (2013.01); *H04L 2001/0097* (2013.01)

(58) Field of Classification Search
CPC combination set(s) only.
See application file for complete search history.

(56) References Cited

U.S. PATENT DOCUMENTS

| 8,494,006 B2 * | 7/2013 | Lee ............................... 370/203 |
| 2010/0285810 A1 | 11/2010 | Ko et al. |
| 2011/0249633 A1 | 10/2011 | Hong et al. |
| 2011/0256868 A1 | 10/2011 | Nogami et al. |
| 2013/0034064 A1 | 2/2013 | Nam et al. |
| 2013/0044707 A1 | 2/2013 | Chen |
| 2013/0058240 A1 | 3/2013 | Kim et al. |
| 2013/0170449 A1 * | 7/2013 | Chen et al. ................... 370/329 |

(Continued)

FOREIGN PATENT DOCUMENTS

| CN | 1996992 A | 7/2007 |
| CN | 102026298 A | 4/2011 |
| WO | 2012161082 A1 | 11/2012 |

OTHER PUBLICATIONS

CATT: "Considerations on UE-specific DM-RS configuration", 3GPP Draft; R1-113732, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; Nov. 14, 2011-Nov. 18, 2011, Nov. 8, 2011 (Nov. 8, 2011), XP050561851.

(Continued)

*Primary Examiner* — Frank Duong
(74) *Attorney, Agent, or Firm* — Patterson & Sheridan, LLP

(57) ABSTRACT

The present disclosure provides techniques for signaling sets of virtual cell IDs available for use in communicating with UEs. Such knowledge may allow a UE to enhance processing its own downlink channels when similar downlink channels for other UEs are multiplexed within the same physical resource block (PRB).

27 Claims, 6 Drawing Sheets

(56) References Cited

U.S. PATENT DOCUMENTS

2013/0183987 A1* 7/2013 Vrzic et al. .................. 455/450
2013/0294368 A1* 11/2013 Bendlin et al. ............... 370/329

OTHER PUBLICATIONS

CATT: "Further details on UE-specific UL DMRS", 3GPP Draft; R1-120106, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; Feb. 6, 2012-Feb. 10, 2012, Jan. 31, 2012 (Jan. 31, 2012), XP050562686.
Huawei et al., "Higher Layer Signalling Requirements for CoMP", 3GPP Draft; R1-121953, 3rd Generation Partnership Project (3GPP), Mobile Competence Centre ; 650, Route Des Lucioles ; F-06921 Sophia-Antipolis Cedex ; France, vol. RAN WG1, No. Prague, Czech Republic; May 21, 2012-May 25, 2012, May 12, 2012 (May 12, 2012), XP050600254.
International Search Report and Written Opinion—PCT/US2013/044423—ISA/EPO—dated Jan. 17, 2014.
LG Electronics: "Remaining details of DL DM-RS sequence for CoMP", 3GPP Draft; R1-122891, 3rd Generation Partnership Project (3GPP), Mobile Competence Centre ; 650, Route Des Lucioles ; F-06921 Sophia-Antipolis Cedex ; France, vol. RAN WG1, No. Prague, Czech Republic; May 21, 2012-May 25, 2012, May 21, 2012 (May 21, 2012), XP050601155.
Potevio: "Further discussion on DMRS for E-PDCCH", 3GPP Draft; R1-121681, 3rd Generation Partnership Project (3GPP), Mobile Competence Centre ; 650, Route Des Lucioles ; F-06921 Sophia-Antipolis Cedex ; France, vol. RAN WG1, No. Jeju island, Korea; Mar. 26, 2012-Mar. 30, 2012, Mar. 20, 2012 (Mar. 20, 2012), XP050599942.
ZTE Corporation: "Need for multiplexing of localised and distributed ePDCCH parts in same PRBs", 3GPP Draft; R1-122108 Need for Multiplexing of Localised and Distributed EPDCCH Parts in Same PRBS, 3rd Generation Partnership Project (3GPP), Mobile Competence Centre ; 650, Route Des Lucioles ; F06921 Sophia-Antipolis Cedex ; France, vol. RAN WG1, No. Prague, Czech Republic; May 21, 2012-May 25, 2012, May 18, 2012 (May 18, 2012), XP050601137.
Hitachi Ltd; "DMRS scrambling sequence for ePDCCH", 3GPP Draft R1-122707, DMRS scrambling sequence for ePDCCH Hitachi V1, 3rd Generation Partnership Project (3GPP), Mobile Competence centre; 650, Route Des Lucioles; F-06921 Sophia-Antipolis Cedex; France, vol. RAN WG1, No. Prague, Czech Republic; May 21, 2012-May 25, 2012, May 12, 2012 (May 12, 2012), XP050600892, [Retrieved on May 12, 2012] the whole document. 0.
Partial International Search Report—PCT/US2013/044423—ISA/EPO—Nov. 4, 2013.
Qualcomm Incorporated: "Reference signals for e-PDCCH," 3GPP Draft R1-121570, Reference signals for e-PDCCH, 3rd Generation Partnership Project (3GPP), Mobile Competence centre; 650, Route Des Lucioles; F-06921 Sophia-Antipolis Cedex; France, vol. RAN WG1, No. Jeju, Korea; Mar. 2, 2013-Mar. 30, 2012, Mar. 20, 2012 (Mar. 20, 2012), XP050599839, [retrieved on Mar. 20, 20120] the whole document.
Alcatel-Lucent., et al., "Design details for enhanced PDCCH", 3GPP TSG-RAN WG1#66bis, R1-113322, Oct. 14, 2011, International Publication No. 2012/161082, 5 pages. URL: http://www.3gpp.org/ftp/tsg_ran/WG1_RL1/TSGR1_66b/Docs/R1-113322.zip.

\* cited by examiner

SIGNALING OF VIRTUAL CELL ID

CLAIM OF PRIORITY UNDER 35 U.S.C. §119

This application claims benefit of U.S. Provisional Patent Application Ser. No. 61/656,895, filed Jun. 7, 2012, which is herein incorporated by reference in its entirety.

BACKGROUND

I. Field

Certain aspects of the present disclosure generally relate to wireless communications and, more particularly, to methods for signaling and receiving virtual cell ID information to facilitate enhanced UE processing of downlink channels.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

In an aspect of the disclosure, a method for wireless communications by a user equipment (UE) is provided. The method generally includes determining a subset of virtual cell IDs available for use by one or more other UEs, the subset selected from a larger set of virtual cell IDs, using the subset of virtual cell IDs to perform at least one of blind detection or blind decoding to detect transmissions within a physical resource block (PRB) intended for other UEs, and using results of the blind detection or blind decoding to enhance processing of at least one downlink channel transmitted to the UE in the PRB.

In an aspect of the disclosure, a method for wireless communications by a base station (BS) is provided. The method generally includes signaling a subset of virtual cell IDs available for use by one or more UEs, the subset selected from a larger set of virtual cell IDs, configuring one or more individual UEs with virtual IDs selected from the subset, and multiplexing downlink channels for multiple UEs in a same physical resource block (PRB) using the selected virtual IDs.

Certain aspects also provide various means, apparatus, and computer program products for performing the methods described herein.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below.

Figure 1:
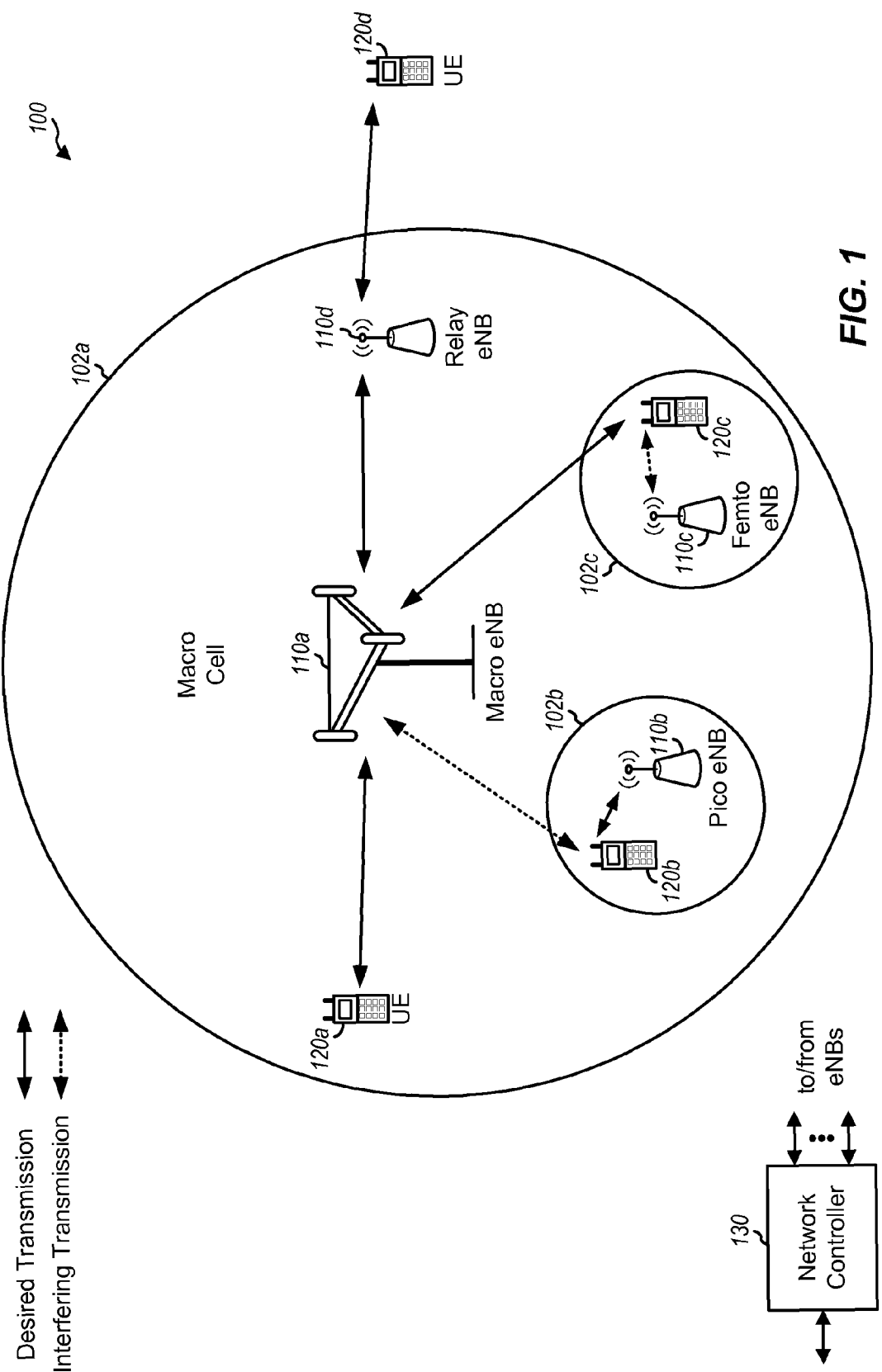
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110*a* may be a macro eNB for a macro cell 102*a*, an eNB 110*b* may be a pico eNB for a pico cell 102*b*, and an eNB 110*c* may be a femto eNB for a femto cell 102*c*. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110*d* may communicate with macro eNB 110*a* and a UE 120*d* in order to facilitate communication between eNB 110*a* and UE 120*d*. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, etc.

Figure 2:
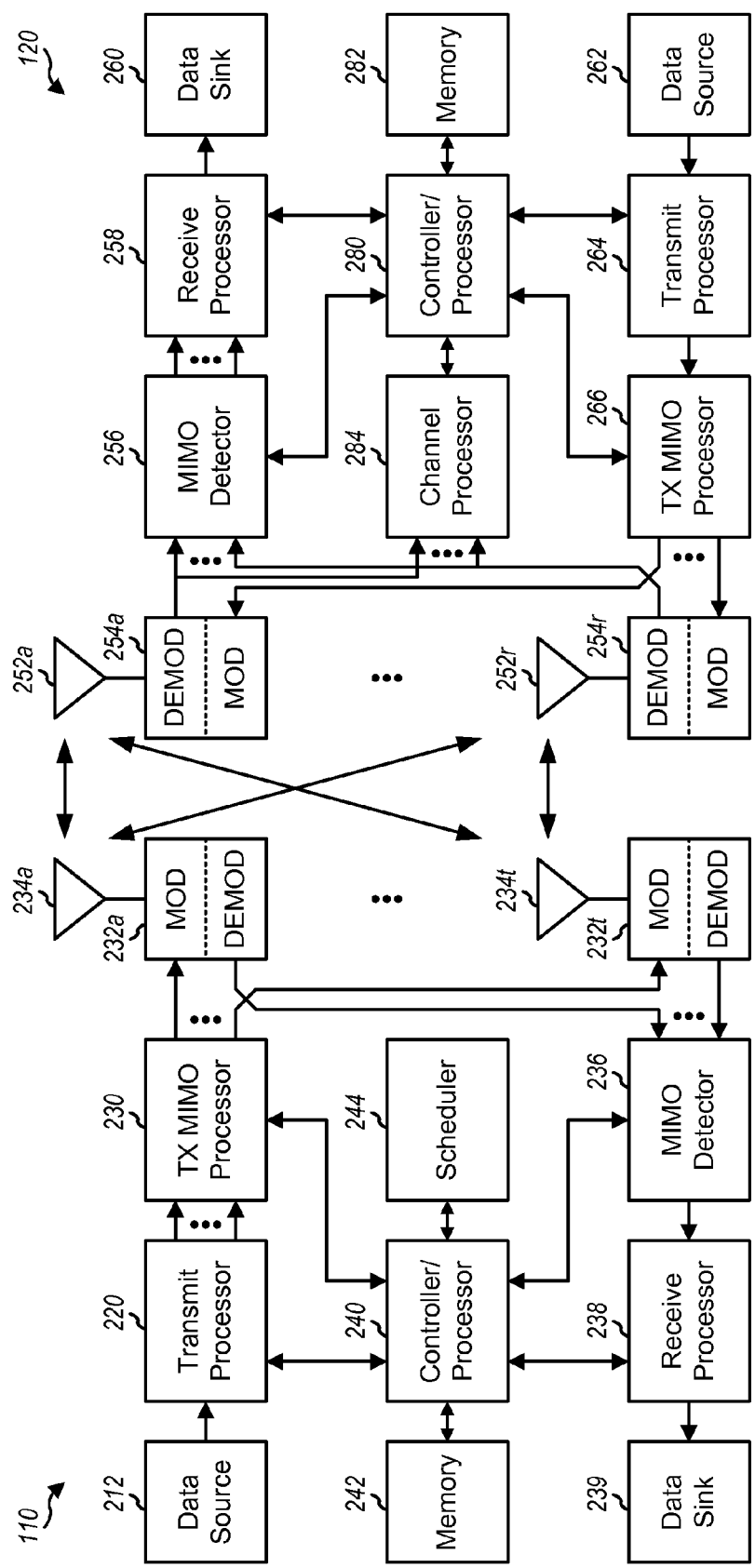
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254*a* through 254*r* (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

As will be described in further detail below, when transmitting data to the UE 120 the base station 110 may be configured to determining a bundling size based at least in part on a data allocation size and precode data in bundled contiguous resource blocks of the determined bundling size, wherein resource blocks in each bundle are precoded with a common precoding matrix. That is, reference signals such as UE-RS and/or data in the resource blocks are precoded using the same precoder. The power level used for the UE-RS in each RB of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
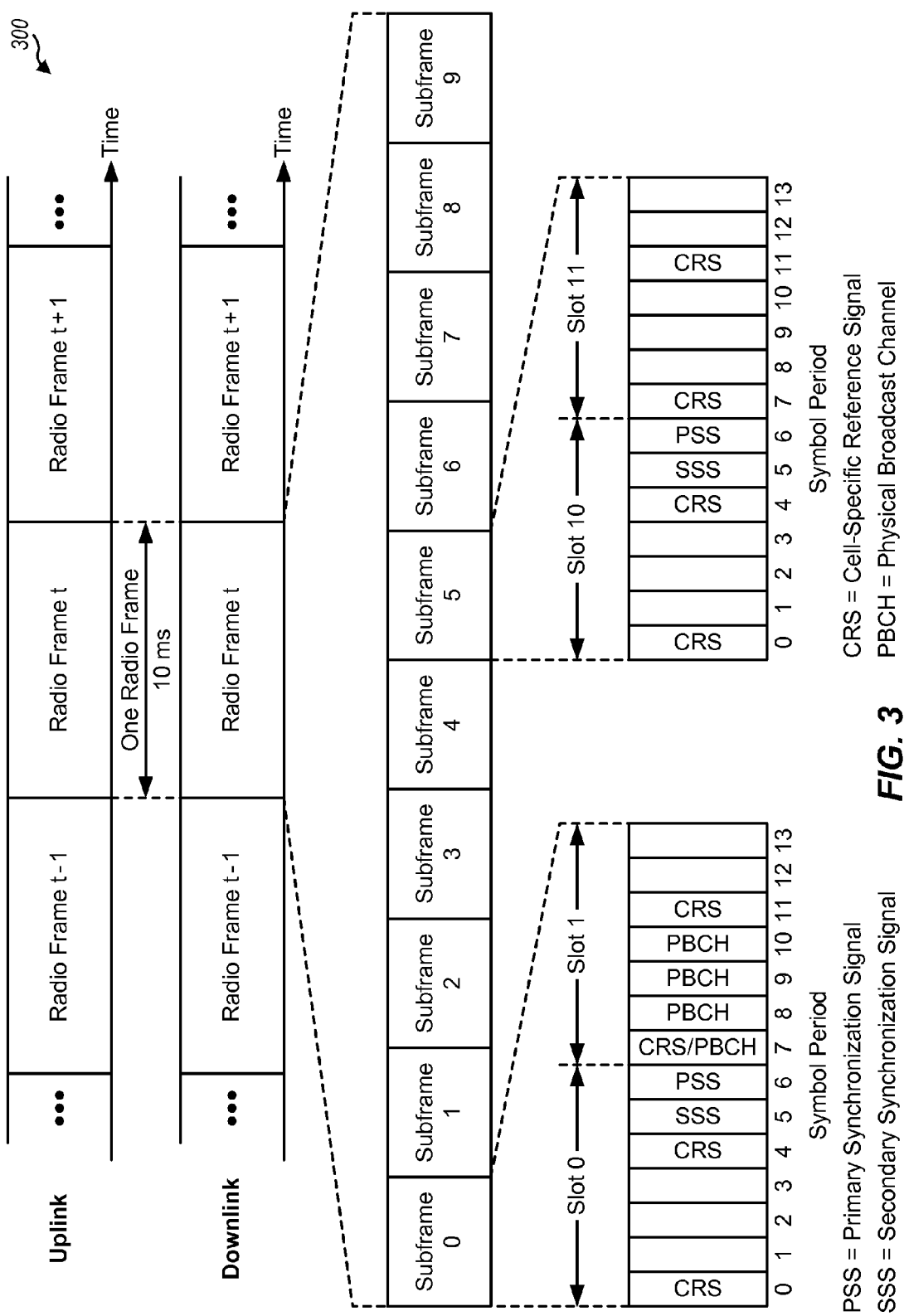
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

In LTE Rel-8/9/10, PDCCH may be located in the first several symbols of a subframe. PDCCH may be fully distributed in the entire system bandwidth. PDCCH may be time division multiplexed with PDSCH. Effectively, in Rel-8/9/10, a subframe may be divided into a control region and a data region.

In Rel-11, a new control (e.g., enhanced PDCCH (ePDCCH)) may be introduced. Unlike legacy PDCCH, which occupies the first several control symbols in a subframe, ePDCCH may occupy the data region, similar to PDSCH. ePDCCH may help increase control channel capacity, support frequency-domain ICIC, achieve improved spatial reuse of control channel resource, support beamforming and/or diversity, operate on the new carrier type and in MBSFN subframes, and coexist on the same carrier as legacy UEs.

Figure 4:
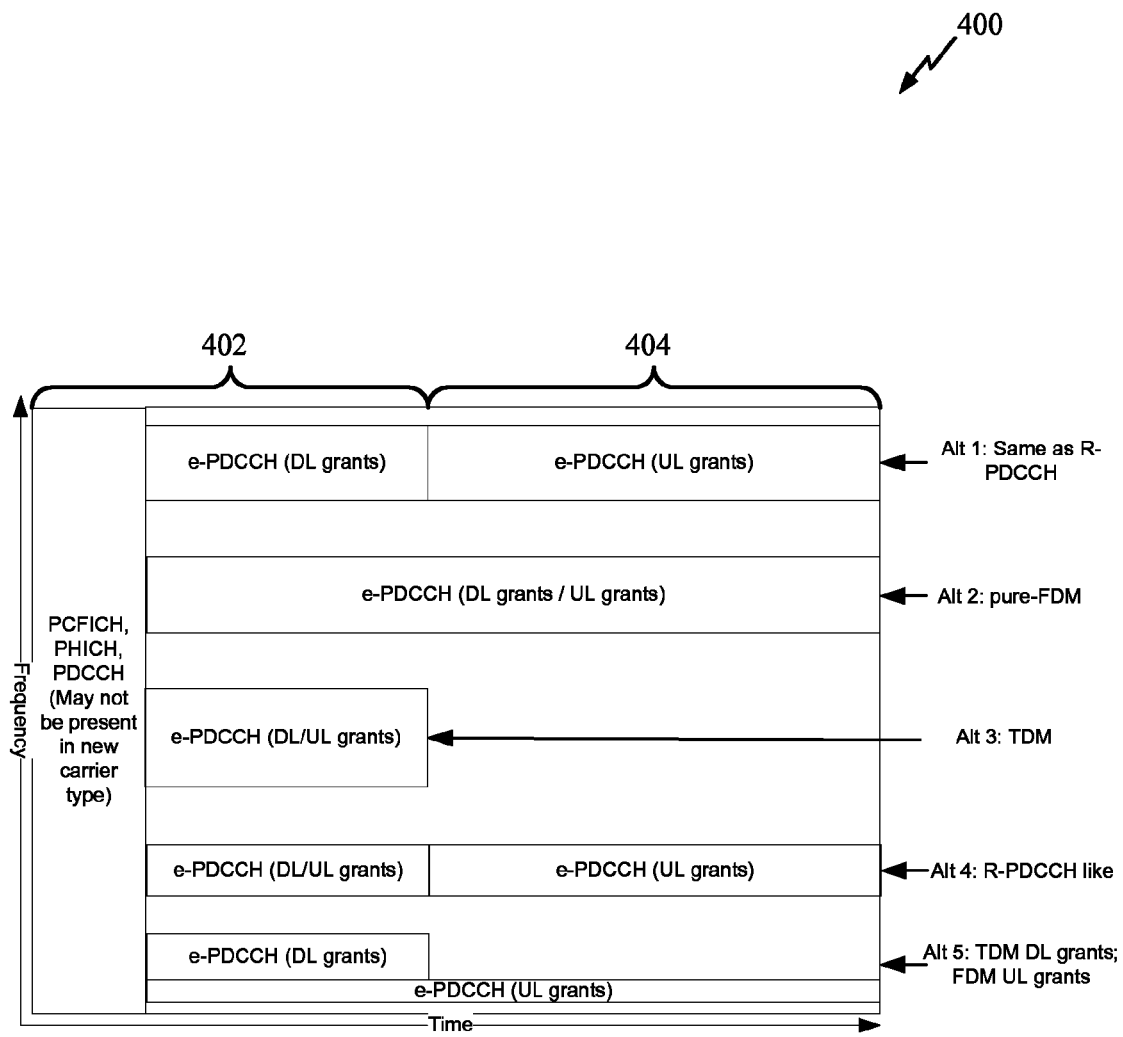
FIG. 4 illustrates an example subframe according to an aspect of the present disclosure.

FIG. 4 illustrates an example subframe 400 according to an aspect of the present disclosure. The subframe 400 is divided into a first slot 402 and a second slot 404, wherein each slot typically comprises 7 symbols in LTE for the normal cyclic prefix (CP) case. Each subframe in LTE spans 1 ms, and therefore, each slot has a duration of 0.5 ms. The first 3 symbols of the backhaul subframe 400 may be used for the Physical Control Format Indicator Channel (PCFICH), the Physical HARQ Indicator Channel (PHICH), and PDCCH. Various ePDCCH structures are available for conveying information in the subframe 400, as illustrated.

With regards to ePDCCH, both localized and distributed transmission of the enhanced control channel may be supported. At least for localized transmission, and for distributed transmission where CRS is not used for demodulation of the enhanced control channel, the demodulation of the enhanced control channel may be based on a demodulation reference signal (DMRS) transmitted in the physical resource block(s) (PRB) used for transmission of the enhanced control channel (e.g., antenna ports 7-10 may be used). ePDCCH messages may span both first and second slots (e.g., FDM-based e-PDCCH) with a restriction on the maximum number of transport channel (TrCH) bits receivable in a transmission time interval (TTI) (e.g., to allow a relaxation of the processing requirements for the UE). Multiplexing of PDSCH and ePDCCH within a PRB pair may not be permitted. Rank-2 SU-MIMO may not be supported for a single blind decoding attempt. The same scrambling sequence generator may be used for ePDCCH DM-RS as PDSCH DM-RS. The scrambling sequence generator of DMRS for ePDCCH on ports 7-10 may be initialized by $$c_{init}=(\lfloor n_s/2 \rfloor+1) \cdot (2X+1) \cdot 2^{16}+n_{SCID}.$$

USE OF VIRTUAL CELL IDS

Under current agreements in RAN1 (Rel-11), virtual cell ID arrangements have been established for use with various transmissions, such as ePDCCH and PDSCH downlink channels. Virtual cell IDs generally refer to a cell ID used for various purposes, such as generating a sequence, indicating how many CRS ports a cell has, what is the starting symbol for the control or data region, and to provide some linking between the virtual cell ID and other cell properties.

Virtual cell IDs may also be used with channel state information reference signals (CSI-RS), which are UE specific. In some cases, rather than use a single cell ID for all of these signals, a base station (eNB) may use different virtual cell IDs for ePDCCH, PDSCH, and CSI-RS.

Virtual cell IDs associated with these channels are signaled to UEs using dedicated RRC signaling. With regards to the utilization of virtual cell IDs for PDSCH, the virtual cell IDs which are signaled to UEs are then used to generate DM-RS sequences and scrambling sequences used for transmissions on the PDSCH.

The above arrangement is different from Rel-9/10, in which DM-RS sequences are determined by actual physical cell IDs-rather than virtual cell IDs. Under this arrangement, the location of DM-RS may not be dependent on cell ID.

Additionally, in Rel-8, DM-RS sequences may be determined by UE-ID, and the location of DM-RS is a function of physical cell ID.

Certain agreements (e.g., in RAN1/Rel-11) may call for an enhanced PDCCH (ePDCCH) resource element (RE) mapping. In Rel-11, ePDCCHs are transmitted in the "data" region. DM-RS is used for demodulation/decoding.

An ePDCCH may occupy only a fraction of a PRB. This is different from DM-RS based PDSCH transmission, in which the PDSCH always occupy a full PRB. In some cases, more than one ePDCCH may be multiplexed into a single PRB. Each of these ePDCCHs may be intended for separate UEs, and each may have a different precoding vector/matrix. This arrangement may create large interference variation within any one PRB for other cells/TPs.

In accordance with certain systems (e.g., LTE Rel-/9/10 arrangements) for the use of DM-RS, an eNB may use MU-MIMO when transmitting PDSCH to UEs. In such cases, however, a UE may not receive signaling indicating whether there are other UEs multiplexed within the same PRB.

However, such knowledge of multiplexing may allow a UE to enhance processing its own PDSCH (e.g., by improving noise estimation or allowing interference cancelation). Given the knowledge of possible DM-RS sequences, a UE may perform blind detection to determine whether there are additional signals (for other UEs) multiplexed within a received PRB. This may be understood with analogy to a 12-month calendar, in which a full PRB corresponds to an entire year, while different months correspond to PDSCH for different users.

In other words, such blind detection relies on (the UE having) knowledge of DM-RS sequences (used for transmissions targeting other UEs). While there may be several available DM-RS sequences, the size of the unknown sequence set may be relatively small (e.g., corresponding to the limited number of physical cell IDs).

Similarly, in certain systems (e.g., LTE Rel-11), MU-MIMO may be supported for ePDCCH. However, there may be no current plans for signaling a UE information regarding the presence of ePDCCH signals intended whether ePDCCHs for other UEs are multiplexed within the same PRB. Knowledge regarding whether (ePDCCHs for) other UEs are multiplexed within a single PRB may allow a UE to enhance processing its own ePDCCH (e.g., by improving noise estimation or allowing interference cancellation).

Unfortunately, currently there may be no mechanism for a UE to determine whether there are downlink channels for other UEs multiplexed within the same PRB. As a result, a UE may not know or be able to derive the DM-RS sequences used in this PRB. With DM-RS determined by virtual cell-IDs, the large number of virtual cell-IDs may make the set of unkown DM-RS sequences simply be too large for blind decoding to be practical. This may lead to noise estimation mismatch when a UE performs PDSCH and/or ePDCCH demodulation and/or decoding.

There may be large performance penalties if a UE determines noise estimation using only DM-RS tones. This may be due to interference variation caused by multiplexing ePDCCH transmissions within a PRB (with each occupying only a portion of the PRB). This phenomenon may be similar to partial loading that occurs with CRS-based PDSCH transmission.

Further, lack of knowledge of DM-RS sequences may also prevent a UE from canceling PDSCH interference (from other cells or transmission points) when processing its own PDSCH. This situation may reduce the likelihood of successfully receiving PDSCH and limit the system capacity.

EXAMPLE SIGNALLING OF VIRTUAL CELL ID

Aspects of the present disclosure provide techniques for signaling a reduced subset of available virtual cell IDs to a UE. This reduced subset may make it possible for a UE to perform blind detection, thereby allowing enhanced processing of any type of downlink channels multiplexed to multiple UEs within a single PRB. These downlink channels may include, for example, PDSCH, PDCCH, ePDCCH, PHICH, and/or PCFICH.

According to certain aspects, a set (or superset) of virtual cell IDs each UE may use may be signaled (e.g., via broadcast signaling). It may be considered a superset because it may include, not only a set of virtual cell IDs available to a particular UE in a given cell, but also other UEs in the same or neighbor cells. Knowledge of this superset may be beneficial because it may be much smaller than the relatively large list of all available virtual cell IDs-with a corresponding reduction in blind decoding candidates a UE has to consider.

In some cases, virtual cell ID sets may be different for different types of channels. As an example, the virtual cell IDs for ePDCCH may be a subset of those for PDSCH.

In the case where a superset of virtual cell IDs is broadcast, an eNB may still use dedicated RRC signaling to configure the virtual cell ID set for an individual UE. Such a virtual cell ID set may be a subset of the broadcast virtual cell ID set. In some cases, the size of virtual cell ID sets for any UE may be limited to some number N. This size may further be signaled to, or ascertained by, a UE to enable improved DM-RS identification within a PRB.

In accordance certain aspects, a set of virtual cell IDs may be derived as a function of a physical cell ID. Thus, by knowing a physical cell ID, a UE may be able to derive the set of virtual cell IDs it can assume are available for use by other UEs, for example, via a fixed or dynamic mapping, or some other type of function. In this case, dedicated signaling (e.g., RRC) may be used to signal a virtual cell ID set which any particular UE can use for decoding its own downlink transmissions (e.g., ePDCCH and/or PDSCH).

In accordance with certain aspects, dedicated signaling may be provided to inform each UE of a set of virtual cell IDs that are potentially used by other UEs in the same cell and/or other cells. In some cases, such signaling may be provided to only a subset of UEs that can use this information (e.g., cell range expansion UEs, UEs potentially communicated to via MU-MIMO, etc.). Efficiency of this approach may depend on the number of UEs in a system. For example, with only a few UEs, dedicated signaling may be more efficient than broadcast signaling.

According to certain aspects, a UE may be provided signaling indicating whether or not the use of virtual cell IDs is enabled in a cell. In other words, whether or not virtual cell IDs are used may be determined on a per-cell basis.

This signaling may be dedicated or broadcast and may be used in conjunction with any of the techniques for virtual cell ID signaling described above. If virtual cell IDs are not enabled, the same ID (e.g., physical cell ID or PCI) may be used for ePDCCH and/or PDSCH. If virtual cell IDs are enabled, a set of virtual cells IDs can be used ePDCCH and/or PDSCH.

In additionally to, or alternatively, to the approaches described above, a UE may receive signaling indicating a set of virtual cell IDs for one or more neighboring cells. In some cases, such information may be communicated via dedicated signaling. As an alternative, a UE may also be detect the set of virtual cell IDs of one or more neighboring cells if the information is broadcasted (e.g., as described above).

Figure 5:
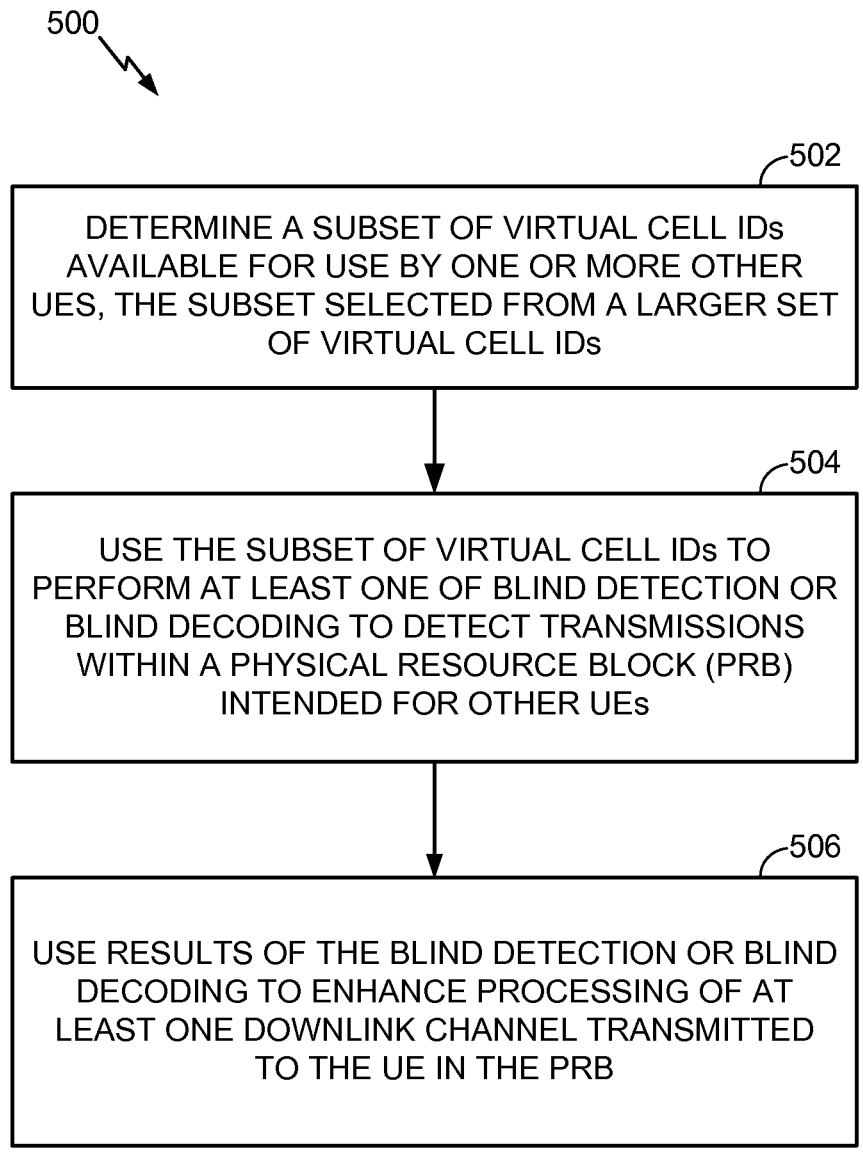
FIG. 5 illustrates example operations that may performed by a UE, in accordance with certain aspects of the present disclosure.

FIG. 5 illustrates example operations 500 that may be performed by a UE, in accordance with aspects of the present disclosure. The operations 500 begin, at 502, with the UE determining a subset of virtual cell IDs available for use by one or more other UEs, the subset selected from a larger set of virtual cell IDs. At 504, the UE may use the subset of virtual cell IDs to perform at least one of blind detection or blind decoding to detect transmissions within a physical resource block (PRB) intended for other UEs. At 506, the UE may use results of the blind detection or blind decoding to enhance processing of at least one downlink channel transmitted to the UE in the PRB.

Figure 6:
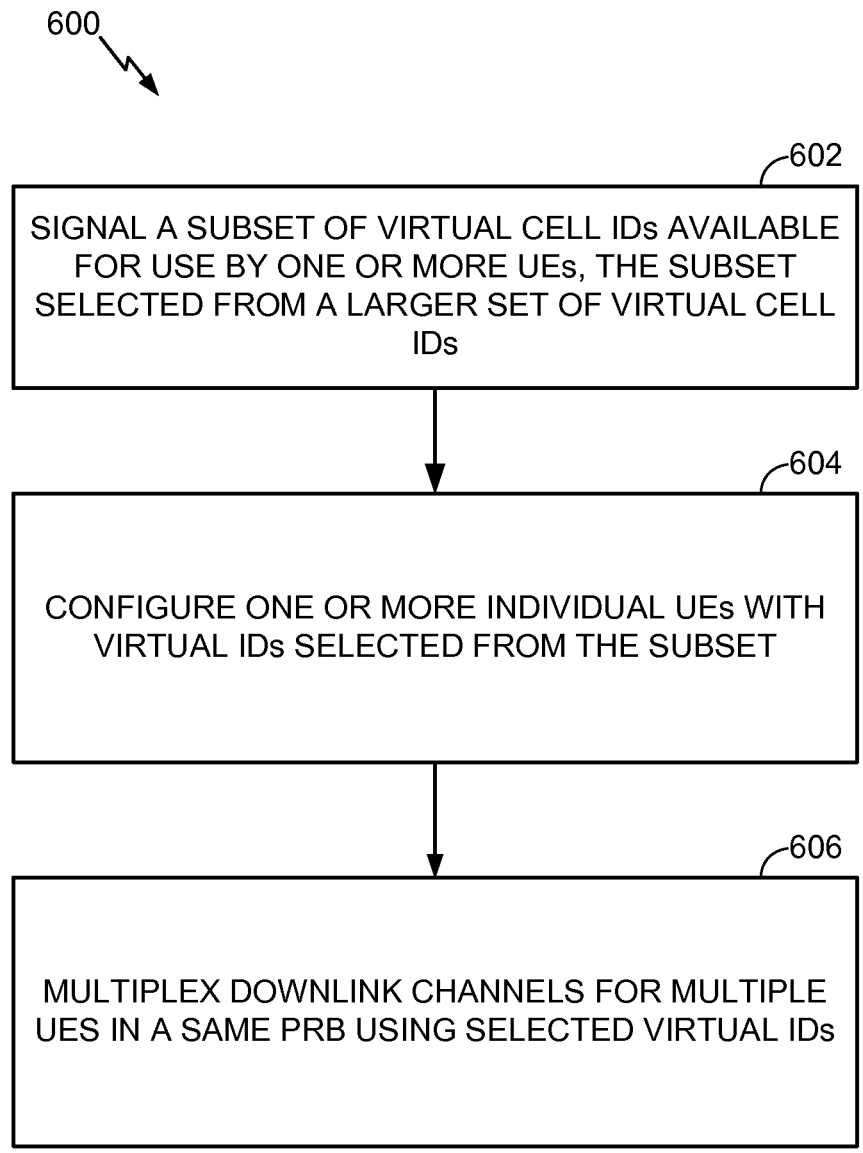
FIG. 6 illustrates example operations that may performed by a base station, in accordance with certain aspects of the present disclosure.

FIG. 6 illustrates example base station operations in accordance with aspects of the present disclosure. At 602, a base station may signal a subset of virtual cell IDs available for use by one or more UEs, the subset selected from a larger set of virtual cell IDs. At 604, the base station may configure one or more individual UEs with virtual cell IDs selected from the subset. At 606, the base station may multiplex downlink channels for multiple uses in a same PRB using selected virtual IDs. In some cases, exchanging information regarding virtual cell IDs with other base stations and coordinating usage of virtual cell IDs based on the information exchanged.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
    determining a subset of virtual cell IDs available for use by one or more other UEs, the subset selected from a larger set of virtual cell IDs; and
    using the subset of virtual cell IDs to enhance processing of at least one downlink channel transmitted to the UE in a physical resource block (PRB).

2. The method of claim 1, wherein using the subset of virtual cell IDs to enhance processing of at least one downlink channel transmitted to the UE in the PRB comprises:
    performing noise estimation when processing the at least one downlink channel using the subset of virtual cell IDs.

3. The method of claim 1, wherein using the subset of virtual cell IDs to enhance processing of at least one downlink channel transmitted to the UE in the PRB comprises:
    canceling interference from one or more downlink channels intended for one or more of the other UEs using the subset of virtual cell IDs.

4. The method of claim 1, wherein the downlink channel comprises a physical downlink shared channel (PDSCH).

5. The method of claim 1, wherein the downlink channel comprises a physical downlink control channel (PDCCH).

6. The method of claim 5, wherein:
    the downlink channel comprises an enhanced PDCCH (ePDCCH) occupying only a fraction of the PRB; and
    a plurality of ePDCCHs for multiple UEs are multiplexed in the PRB.

7. The method of claim 1, further comprising:
    generating demodulation reference signal (DM-RS) sequences based on the subset of virtual cell IDs; and
    performing at least one of blind detection or blind decoding to detect corresponding DM-RS sequences in the PRB.

8. The method of claim 1, further comprising:
    receiving signaling indicating whether or not the use of virtual cell IDs is enabled.

9. The method of claim 1, wherein determining the subset of virtual cell IDs comprises:
    receiving a broadcast of one or more sets of virtual cell IDs the UE and the one or more other UEs may use.

10. The method of claim 9, wherein the one or more sets of virtual cell IDs comprise:
    a first set for use in transmitting physical downlink shared channels (PDSCHs); and
    a second set for use in transmitting physical downlink control channels (PDCCHs).

11. The method of claim 1, wherein determining the subset of virtual cell IDs comprises:
    deriving virtual cell IDs in the subset based on a physical cell ID.

12. The method of claim 1, wherein using the subset of virtual cell IDs to enhance processing comprises:
    using the subset of virtual cell IDs to detect channel state information reference signals (CSI-RS).

13. The method of claim 1, wherein using the subset of virtual cell IDs to enhance processing comprises:
    using the subset of virtual cell IDs to perform at least one of blind detection or blind decoding to detect transmissions within the PRB intended for other UEs.

14. An apparatus for wireless communications by a user equipment (UE), comprising:
    means for determining a subset of virtual cell IDs available for use by one or more other UEs, the subset selected from a larger set of virtual cell IDs; and
    means for using the subset of virtual cell IDs to enhance processing of at least one downlink channel transmitted to the UE in a physical resource block (PRB).

15. The apparatus of claim 14, wherein the means for using the subset of virtual cell IDs to enhance processing of at least one downlink channel transmitted to the UE in the PRB comprises:
    means for performing noise estimation when processing the at least one downlink channel using the subset of virtual cell IDs.

16. The apparatus of claim 14, wherein the means for using the subset of virtual cell IDs to enhance processing of at least one downlink channel transmitted to the UE in the PRB comprises:
    means for canceling interference from one or more downlink channels intended for one or more of the other UEs using the subset of virtual cell IDs.

17. The apparatus of claim 14, wherein the downlink channel comprises a physical downlink shared channel (PDSCH).

18. The apparatus of claim 14, wherein the downlink channel comprises a physical downlink control channel (PDCCH).

19. The apparatus of claim 18, wherein:
    the downlink channel comprises an enhanced PDCCH (ePDCCH) occupying only a fraction of the PRB; and
    a plurality of ePDCCHs for multiple UEs are multiplexed in the PRB.

20. The apparatus of claim 14, further comprising:
    means for generating demodulation reference signal (DM-RS) sequences based on the subset of virtual cell IDs; and
    means for performing at least one of blind detection or blind decoding to detect corresponding DM-RS sequences in the PRB.

21. The apparatus of claim 14, further comprising:
    means for receiving signaling indicating whether or not the use of virtual cell IDs is enabled.

22. The apparatus of claim 14, wherein the means for determining the subset of virtual cell IDs comprises:
    means for receiving a broadcast of one or more sets of virtual cell IDs the UE and the other UEs may use.

23. The apparatus of claim 22, wherein the one or more sets of virtual cell IDs comprise:
    a first set for use in transmitting physical downlink shared channels (PDSCHs); and
    a second set for use in transmitting physical downlink control channels (PDCCHs).

24. The apparatus of claim 14, wherein the means for determining the subset of virtual cell IDs comprises:
    means for deriving virtual cell IDs in the subset based on a physical cell ID.

25. The apparatus of claim 14, wherein the means for using the subset of virtual cell IDs to enhance processing comprises:
    means for using the subset of virtual cell IDs to detect channel state information reference signals (CSI-RS).

26. An apparatus for wireless communications by a user equipment (UE), comprising:
    at least one processor configured to determine a subset of virtual cell IDs available for use by one or more other UEs, the subset selected from a larger set of virtual cell IDs, and use the subset of virtual cell IDs to enhance processing of at least one downlink channel transmitted to the UE in a physical resource block (PRB); and a memory coupled with the at least one processor.

27. A computer program product for wireless communications by a user equipment (UE), comprising a non-transitory computer readable medium having instructions stored thereon for:

determining a subset of virtual cell IDs available for use by one or more other UEs, the subset selected from a larger set of virtual cell IDs; and using the subset of virtual cell IDs to enhance processing of at least one downlink channel transmitted to the UE in a physical resource block (PRB).

* * * * *